United States Patent

Hentz et al.

[11] Patent Number: 6,033,098
[45] Date of Patent: Mar. 7, 2000

[54] BAR HANGER CLIP

[75] Inventors: Joseph A. Hentz, Crawfordsville; Philip D. Wright, Waveland, both of Ind.

[73] Assignee: NSI Enterprises Inc., Atlanta, Ga.

[21] Appl. No.: 09/126,690

[22] Filed: Jul. 30, 1998

[51] Int. Cl.[7] ........................................................ F21S 1/02
[52] U.S. Cl. ...................... 362/430; 362/147; 362/365; 362/368; 362/396; 248/228.7; 248/231.81; 248/343
[58] Field of Search ..................................... 362/147, 288, 362/364, 365, 366, 368, 396, 418, 430; 248/228.7, 229.26, 231.81, 343, 344

[56] References Cited

U.S. PATENT DOCUMENTS

| | | |
|---|---|---|
| 4,313,154 | 1/1982 | Capostango et al. . |
| 4,336,575 | 6/1982 | Gilman . |
| 4,471,416 | 9/1984 | Druffel . |
| 4,477,865 | 10/1984 | Tsuyama ................................. 362/430 |
| 4,577,824 | 3/1986 | Druffel et al. . |
| 4,723,747 | 2/1988 | Karp et al. . |
| 4,760,981 | 8/1988 | Hodges . |
| 4,972,339 | 11/1990 | Gabrius . |
| 5,029,794 | 7/1991 | Wolfe . |
| 5,045,985 | 9/1991 | Russo et al. . |
| 5,209,444 | 5/1993 | Rinderer . |
| 5,436,810 | 7/1995 | Sutherland et al. ..................... 362/430 |
| 5,690,423 | 11/1997 | Hentz et al. . |

*Primary Examiner*—Darren E. Schuberg
*Attorney, Agent, or Firm*—Kenneth E. Darnell

[57] ABSTRACT

A clip mountable to a lighting fixture or the like adjacent a bar hanger assembly for pivotal movement between positions which are either disengaged from the bar hanger assembly or engaged with the bar hanger assembly in one or more positions, disengagement of the clip allowing elements of the bar hanger assembly to be displaced relative to each other to fit the fixture properly in an installation between joists of a ceiling or a gridwork of a suspended ceiling. Engagement of the clip with portions of the bar hanger assembly of two differing sizes allows positive latching of the bar hanger assembly to the fixture regardless of the degree of extension between the elements of the bar hanger assembly. The clip is easily moved between latched and unlatched positions by means of thumb pressure.

14 Claims, 3 Drawing Sheets

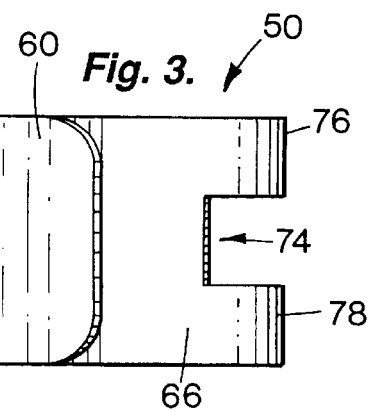
Fig. 3.
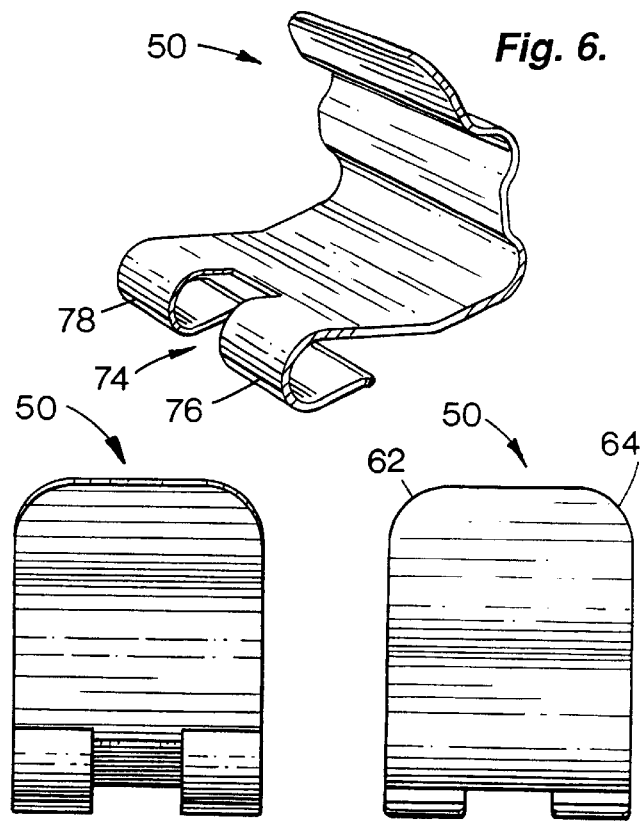
Fig. 6.
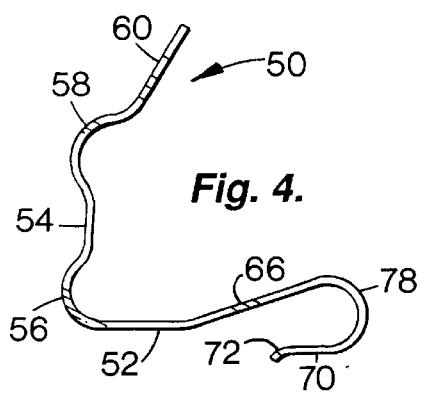
Fig. 4.
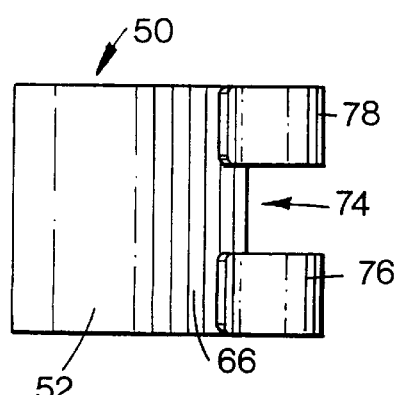
Fig. 5.
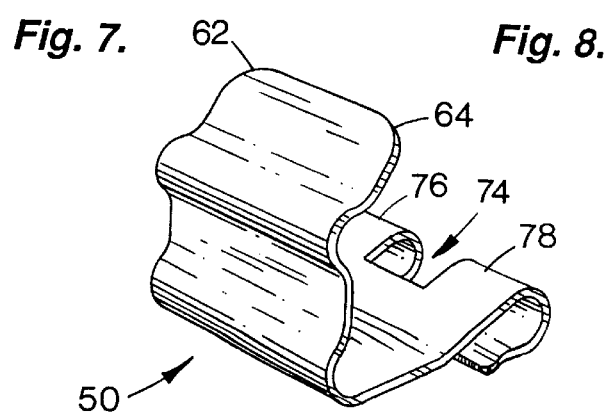
Fig. 7. Fig. 8.
Fig. 9.

BAR HANGER CLIP

BACKGROUND OF THE INVENTION

1. Field of the Invention

The invention relates to lighting fixtures or the like wherein rail elements are carried by the lighting fixture for "rough-in" or mounting of the fixture between ceiling joists or the like or engagement of the fixture with gridwork of a suspended ceiling and particularly to a clip or latching structure mounted to the lighting fixture to engage or latch the rail elements in place once the fixture is positioned properly in an installed configuration.

2. Description of the Prior Art

Lighting fixtures and particularly recessed downlighting fixtures mountable above the ceiling to building structural elements or to a gridwork of a suspended ceiling are often mounted within the ceiling by means of bar hanger assemblies which are carried by the lighting fixture. A description of recessed lighting fixtures in particular and components of such fixtures including bar hanger assemblies can be found in U.S. Pat. No. 5,690,423, the disclosure of which is incorporated hereinto by reference. While U.S. Pat. No. 5,690,423 provides description of bar hanger assemblies in general and also describes a particular bar hanger assembly useful according to the present invention, a more extensive description of bar hanger assemblies and a particular bar hanger assembly useful according to the invention can be found in co-pending U.S. patent application Ser. No. 08/690,314, filed Jul. 25, 1996, now abandoned, and assigned to the same assignee, the disclosure of this patent application being incorporated hereinto by reference. As is discussed in detail in the aforesaid co-pending United States patent application, bar hanger assemblies are typically formed of two elongated elements slidable relative to each other, the assembly being slidable relative to the lighting fixture itself, to allow extension between lengths slightly greater than any one of the elements and slightly less than the combined length of the two elements, ends of the elements being nailed or otherwise affixed to wooden joists of the ceiling or the like. U.S. Pat. No. 4,723,747 to Karp et al describes an extensible bar hanger assembly intended to support recessed lighting fixtures in a ceiling. The Karp et al bar hanger assemblies include a pair of hanger bars with each of the bars having a longitudinally extending dome providing stiffness to the structure and with each bar having a longitudinally extending slot formed in the top of the dome and which is adapted to receive interlocking ends of the bar hangers. The bar hangers of Karp et al typically require a user-supplied securing nail in order to fasten each end of two bar hanger assemblies to spaced wooden joists between which a recessed lighting fixture is mounted by the Karp et al bar hangers. Druffel et al, in U.S. Pat. No. 4,577,824, describe bar hanger assemblies intended to be mounted to structural members such as beams, joists or the like normally found in buildings and which are intended to mount electrical lighting units in such buildings. Druffel et al provide multi-element bar hangers which slide relative to each other and which include two-prong nailing elements at each end of the bar hanger so described, it still being necessary in the Druffel et al structure to utilize user-supplied fasteners such as nails to complete mounting of a lighting fixture, ceiling fan mount or the like carried by the bar hanger assemblies and attached to a joist or the like. Wolf, in U.S. Pat. No. 5,029,794, describes bar hanger assemblies intended to support lighting fixtures in the ceiling of a building. The elements forming the Wolf bar hanger assembly include dimensioned slots which are intended to mate with protuberances extending from another element of the bar hanger assembly. Other bar hanger assembly structures are shown and described in U.S. Pat. No. 4,313,154 to Capostagno et al; U.S. Pat. No. 4,336,575 to Gilman; U.S. Pat. No. 4,471,416 to Druffel and 4,972,339 to Gabrius to name a few. The bar hanger assemblies of these patents must typically be attached by user-supplied nails or the like to joists between which the bar hanger assemblies mount a recessed lighting fixture or the like. Bar hanger assemblies are also known in the art which include nailing plates disposed at the ends of bar elements and which allow mounting of the bar hanger assemblies and thus lighting fixtures carrying the bar hanger assemblies to joists without the need for user-supplied fasteners. Bar elements of available bar hanger assemblies also include integral T-bar notch/tabs which allow securement of a recessed lighting fixture by means of the bar hanger assembly to a suspended ceiling using a T-bar arrangement without the need for additional clips or wires. Russo et al, in U.S. Pat. No. 5,045,985 provides at the ends of bar elements forming a bar hanger assembly separate structural elements which function to hold the bar elements to a T-bar gridwork. U.S. Pat. No. 4,760,981 to Hodges discloses a tab/notch arrangement which allows mounting to a gridwork of a suspended ceiling.

Certain of the bar hanger assembly structures disclosed in the art and particularly those structures wherein a track element is formed integrally with a pan of the lighting fixture are provided with fastening structure which holds the bar elements in place once the bar hanger assembly is extended to a proper degree to fit the lighting fixture within and mount the lighting fixture to the dimensions of a particular installation situation. These fasteners are typically screw fasteners or the like which are typically tightened down with a tool such as a screwdriver and which can be lost during manipulation of the lighting fixture while said fixture is undergoing the "rough-in" process. Rinderer, in U.S. Pat. No. 5,209,444 describes a support for an electrical box wherein structural elements mounting the electric box and slidable relative to each other are held in place by screws once the structure is positioned for mounting between spaced-apart wall studs or the like. However, the art has not previously provided simple structure carried by the lighting fixture which can be operable without tools and both easily and quickly manipulated to latch the bar hanger assembly to the lighting fixture once the bar elements of the bar hanger assembly have been extended to appropriate positions. The art has further felt a long-standing need for a structure capable of being latchable to a bar hanger assembly at locations of the bar hanger assembly of differing size so that positive engagement can be made with either a track element of the bar hanger assembly or a slide element of the bar hanger assembly, such slide element typically being of a reduced size relative to the track element. The invention provides answers to these long-felt needs in the art by providing a clip pivotally mountable to a lighting fixture adjacent or near to a bar hanger assembly and movable between an unlatched position for allowing relative extension between bar elements of a bar hanger assembly and movement between the bar hanger assembly and the lighting fixture carrying the said assembly and one or more latching positions wherein bar elements and the bar hanger assembly are latched in place relative to the lighting fixture once appropriate extension of the bar elements has been determined for a use situation.

SUMMARY OF THE INVENTION

The invention provides a clip which is preferably pivotally mounted to a lighting fixture carrying at least one bar hanger assembly useful in the mounting of a recessed lighting fixture or the like to wooden joists in a ceiling or to a suspended ceiling such as would include a T-bar mounting arrangement, two of the bar hanger assemblies typically being carried by a mounting pan of the lighting fixture on opposing sides thereof so that the fixture can be securely mounted between wooden joists through the use of nailer plates or the like such as can be formed integrally with the bar hanger assembly at each end thereof. In use with a suspended ceiling, the fixture is mounted by means of integral T-bar notch/tabs at each end of the bar hanger assemblies for securement to a T-bar arrangement of a suspended ceiling or the like. The clips of the invention latch bar elements of a bar hanger assembly positively in place relative to the lighting fixture once the bar elements of the bar hanger assembly are appropriately extended in order to fit the exigencies of an installation situation.

The clip of the invention can be used with a variety of bar hanger assemblies to latch bar elements forming said bar hanger assemblies in place or to be readily disengaged from said bar hanger assemblies to allow extension of the bar elements relative to each other to allow fitting of the light fixture in place in an installation. The clip of the invention is pivotally and permanently carried by the lighting fixture itself thus preventing the loss of the clip as can occur when separately provided fasteners such as screws or the like are used to accomplish a similar function. The clip of the invention can be pivoted to a disengaged position such that the clip does not contact the bar hanger assembly or bar elements of the assembly, thereby allowing the bar elements to be moved relative to each other and the bar hanger assembly to be moved relative to the lighting fixture carrying said bar hanger assembly so that the bar elements can be positioned relative to each other to allow mounting to structural joists or to a suspended ceiling. Once the bar elements are positioned appropriately relative to each other and the bar hanger assembly is positioned appropriately relative to the fixture itself, the clip can be pivoted into engagement with one or more portions of the bar hanger assembly to latch at least one of the bar elements in place relative to the lighting fixture itself. The clip is movable between at least two latching positions in order to contact a larger track element or a smaller slide element depending upon which element opposes the clip at the position of the clip on the lighting fixture due to relative extension between the bar elements of the bar hanger assembly.

Accordingly, it is an object of the invention to provide a clip mountable to a lighting fixture in adjacent relation to a bar hanger assembly used for mounting the lighting fixture or the like to wooden joists within a ceiling or to a suspended ceiling having a T-bar mounting arrangement, the clip latching the bar hanger assembly in place once bar elements of the bar hanger assembly are appropriately positioned relative to each other to fit the lighting fixture into an installation.

It is another object of the invention to provide a clip capable of latching a bar hanger assembly to a lighting fixture with the clip being carried by the lighting fixture itself so that the clip cannot be lost or misplaced prior to a need for use of the clip.

It is a further object of the invention to provide a clip mountable to a lighting fixture and capable of being pivoted by manual pressure between latched and unlatched positions so as to allow appropriate functioning of a bar hanger assembly prior to positively latching said assembly in place relative to the lighting fixture in an installation.

Further objects and advantages of the invention will become more readily apparent in light of the following detailed description of the preferred embodiments.

BRIEF DESCRIPTION OF THE DRAWING

FIG. 3 is a front elevational view of the clip shown in FIGS. 1 and 2;

FIG. 4 is a side elevational view of the clip of FIG. 3;

FIG. 5 is a bottom view of the clip of FIG. 3;

FIG. 6 is a perspective view of the clip of FIG. 3 taken from the front and to one side thereof;

FIG. 7 is a front elevational view of the clip of FIG. 3;

FIG. 8 is a rear elevational view of the clip of FIG. 3; and,

FIG. 9 is a perspective view of the clip of FIG. 3 taken from the rear and to one side thereof.

DESCRIPTION OF THE PREFERRED EMBODIMENTS

Figure 1:
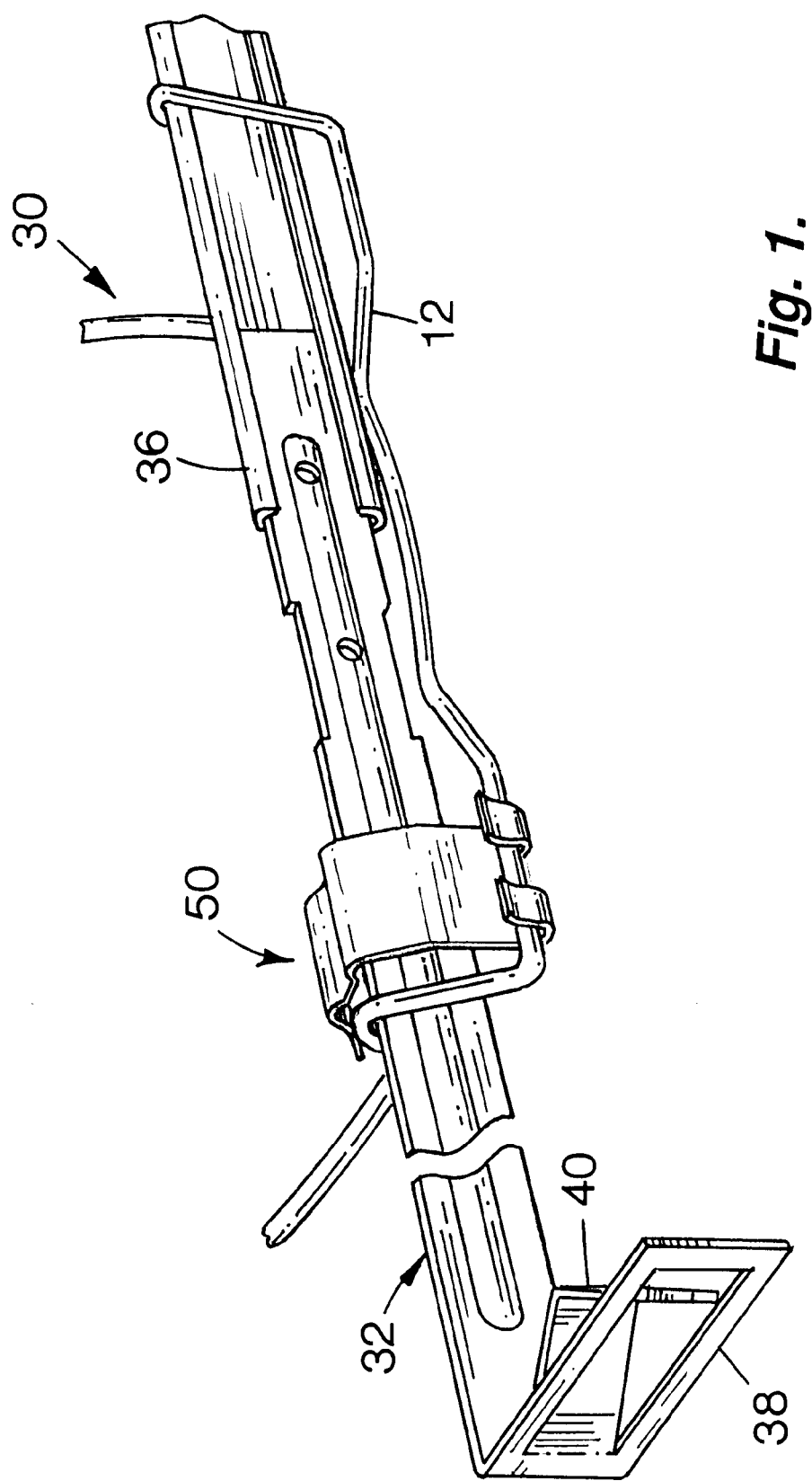
FIG. 1 is a perspective view of a portion of a bar hanger assembly taken from a first end thereof and illustrating the location of the present bar hanger clip as mounted to a portion of a wire frame pan adjacent to the bar hanger assembly.
Figure 2:
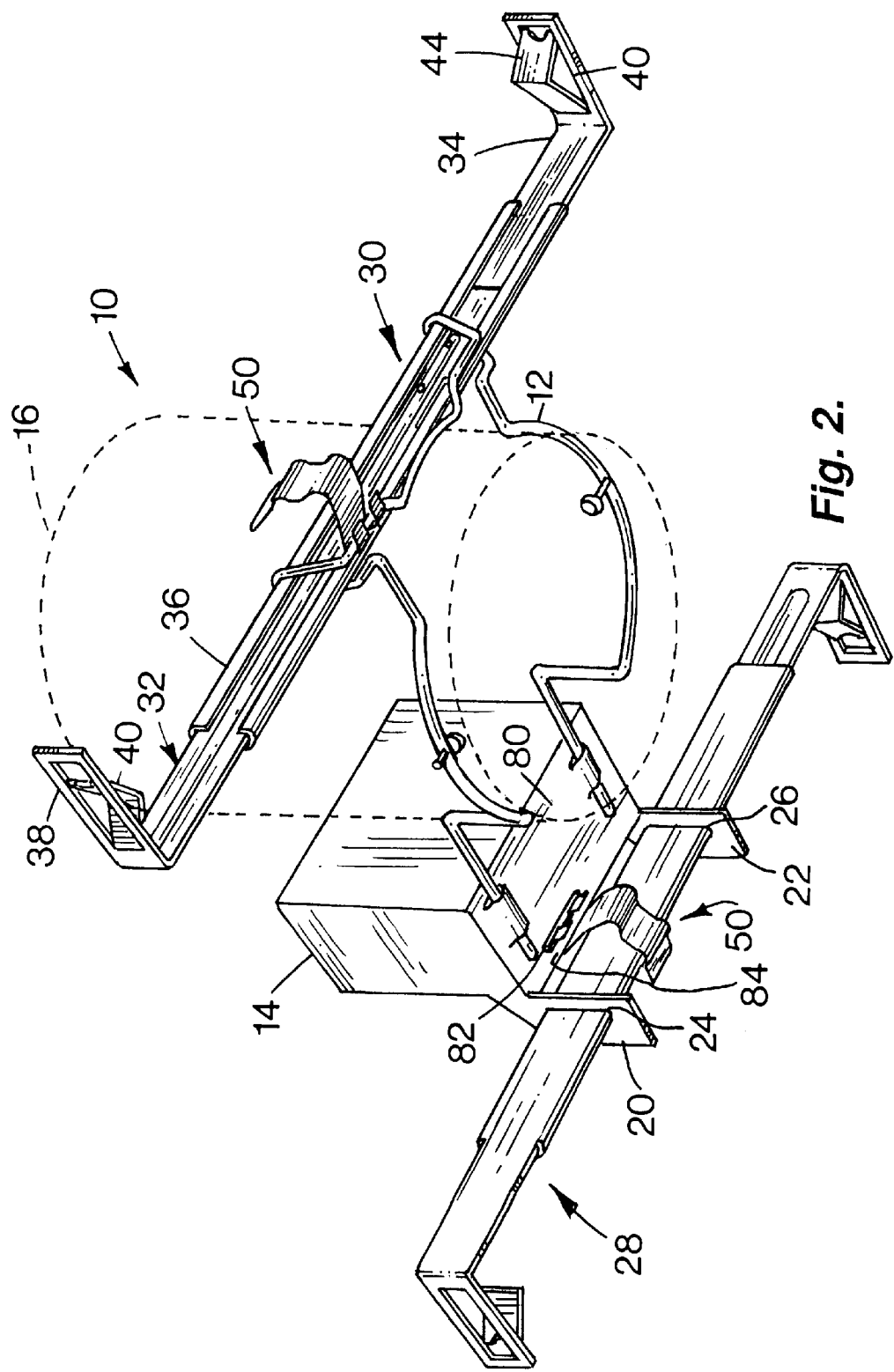
FIG. 2 is a perspective view of a lighting fixture taken from a position below and to the side of the fixture and illustrating the locations of bar hanger clips configured according to the invention and respectively mounted to a plate forming a floor of a junction box carried by the wire frame pan and mounted to the wire frame pan.

Referring now to the drawings and particularly to FIGS. 1 and 2, a lighting fixture is seen generally at 10 to comprise a recessed lighting fixture such as is described in U.S. Pat. No. 5,690,423, the disclosure of which is incorporated hereinto by reference as aforesaid, the fixture 10 being a particular fixture with which the present invention functions to produce the objects and advantages referred to herein. It is to be understood, however, that lighting fixtures, particularly downlighting fixtures, employing painted steel pans such as are conventional in the art and other pans such as the pan described in U.S. Pat. No. 5,662,414, assigned to the assignee of the present application and incorporated hereinto by reference, can also be improved through use therewith of the present invention. As shown best in FIG. 2, the lighting fixture 10 is provided with a wire frame pan 12 such as is disclosed in detail in aforesaid U.S. Pat. No. 5,690,423. The pan 12 mounts a junction box 14 and a can 16 for "rough-in" above a ceiling (not shown) to produce downlighting in an environmental space below the ceiling. A standard conduit (not shown) extends from the junction box 14 to the can 16 in a conventional manner to allow access of insulated wiring (not shown) into the interior of the can 16 to provide power to a lamp (not shown) mounted within the interior of the can 16. The connection of electrical power to lamping within the can 16 through the junction box 14 as well as the provision of finishing trim and the like (not shown) is conventional and need not be described in detail herein.

The junction box 14 is essentially identical as shown to that junction box described in U.S. Pat. No. 5,690,423, the main body of the junction box 14 being formable from a flat, stamped piece of metal which is then bent to assemble the junction box 14 with mounting plates 20 and 22 being formed integrally with the junction box 14. Each of the mounting plates 20 and 22 are respectively formed with slots 24 and 26 which align on assembly of the junction box 14 to receive a bar hanger assembly 28 to thus mount said assembly 28 to the fixture 10.

At the opposite end of the lighting fixture 10, a bar hanger assembly 30 is mounted by the wire frame pan 12 as is described in detail in U.S. Pat. No. 5,690,423. The bar hanger assembly 30 is thus mounted to the fixture 10 through direct connection to the wire frame pan 12 while the bar hanger assembly 28 is mounted by the junction box 14 by means of the mounting plates 20 and 22 which can be integrally formed with the junction box 14.

The structure and function of the bar hanger assemblies 28 and 30 are essentially identical. While the bar hanger assemblies shown in the aforesaid patents and described in detail in co-pending U.S. patent application Ser. No. 08/690, 314, filed Jul. 25, 1996, all of these entities being incorporated hereinto by reference, are particularly suited to use with the present invention, it is to be understood that the bar hanger assemblies 28 and 30 can take other forms and can vary from the bar hanger assemblies described in detail in said patent application.

A brief discussion of the function of the bar hanger assembly 30 will be provided herein, only one of the bar hanger assemblies 28, 30 being necessarily described since the structure and function thereof are essentially identical. The bar hanger assembly 30 is formed of a slide element 32 and a track element 34, the elements 32 and 34 being often referred to as "bar" elements. The track element 34 has a guideway or track 36 formed by the bending over of opposite lateral edges of said track element 34 to form said track 36. The track 36 receives the slide element 32 thereinto for sliding movement therein. Each of the elements 32, 34 are provided with nailing plates 38 and 40 on respective outermost ends thereof, the nailing plates 38, 40 being respectively bent at angles of 90° relative to the longitudinal axes of the elements 32, 34. While these nailing plates can take different forms, it is desirable to stamp barbs 40, 44 from the respective planar body portions of the nailing plates 38, 40, the structure thus described facilitating rapid mounting to wooden joists (not shown). The mounting of the lighting fixture 10 to wooden joists in a ceiling is essentially conventional. The bar hanger assemblies 28, 30 can be adjusted lengthwise by virtue of the ability of the elements 32, 34 to slide relative to each other. The bar hanger assembly 30 is also capable of sliding relative to the wire frame pan 12. Similarly, the bar hanger assembly 28 can slide within the slots 24, 26 formed in the mounting plates 20, 22 of the junction box 14. When the lighting fixture 10 is to be mounted above a suspended ceiling, J-channel notches (not shown) formed at ends of the bar elements 32, 34 allow mounting in a conventional manner to T-bar structures (not shown) of such suspended ceilings. A scale can be formed on the element 34 (the scale not being shown) to allow estimation of the degree of elongation necessary for appropriate fitting of the bar hanger assemblies 28, 30 between joists or between T-bar structures of a suspended ceiling as is conventional in the art.

Referring now to FIGS. 1 through 9, a bar hanger clip is seen at 50 to comprise a single piece of 0.020 inch zinc-plated spring steel formed by stamping or similar operations and the like to comprise a flat, planar base portion 52 joined to a planar body portion 54 by means of a first arcuate section 56, the plane of the body portion 54 being disposed at slightly less than 90° from the plane of the base portion 52. A second arcuate section 58 joins the other end of the planar body portion 54 to an angled distal portion 60 which is also planar and which rounds at corners 62 and 64 with a radius of approximately 0.15 inch. The base portion 52 joins at the end thereof opposite the juncture with the first arcuate section 56 with an angled proximal section 66 which terminates in a third arcuate section 68, the arcuate section 68 then terminating in recurving fashion to form a terminal planar section 70 which then terminates with a recurved end portion 72.

A portion of the angled proximal section 66, the entirety of the third arcuate section 68, the terminal planar body portion 70 and the recurved end portion 72 can be notched at 74 to form spaced hinging legs 76 and 78. The hinging legs 76 and 78 are clipped over a portion of the wire frame pan 12 as best seen in FIG. 1 and in adjacent relationship to the bar hanger assembly 30. The clip 50 can then pivot about that portion of the wire frame pan 12 to which it is mounted to be positioned in an unlatched configuration (seen in FIG. 2) such that the bar hanger assembly 30 is not latched in position and can be moved relative to the fixture 10 to an appropriate position as aforesaid. As has also been discussed, the slide element 32 and the track element 34 of the bar hanger assembly 30 can be moved relative to each other to desired positions as long as the clip 50 is maintained in the unlatched position.

The bar hanger clip 50 can be pivoted about that portion of the wire frame pan to which it is attached to engage in a snap-fitting manner the bar hanger assembly 30. In the event that extension of the bar hanger assembly 30 causes the track element 34 to be disposed in opposing relation to the clip 50, the clip 50 latches to the bar hanger assembly 30 by means of engagement between the second arcuate section 58 of the clip 50 and upper edge portions of the bar hanger assembly 30, thereby locking the track element 34 in place. This mounting is seen in FIG. 1 in relation to the clip 50 to the left of the drawing. In the event that extension of the bar hanger assembly 30 causes the slide element 32 to oppose the bar hanger clip 50, the first arcuate section 56 of the clip 50 is caused to engage upper edge portions of the slide element 32, thereby to lock the slide element 32 in place. This mounting is seen in FIG. 1 in relation to the clip 50 which is shown to be clipped to the slide element 32. Manipulation of the clip 50 can occur through the use of thumb pressure exerted against the angled distal portion 60 of said clip 50. The clip 50 thus functions in the manner described herein in an unlatched configuration such that the bar hanger assembly 30 and the elements 32, 34 comprising said assembly 30 can be fitted to the particular dimensions of an installation. The clip 50 is then employed to engage either the slide element 32 or the track element 34 of the bar hanger assembly 30 to produce the locking function described herein.

As can best be seen in FIG. 2, an identical bar hanger clip 50 can be employed to perform the same functions relative to the bar hanger assembly 28 mounted by the junction box 14. A base plate 80 forming the "floor" of the junction box 14 is provided with a slot 82 near an outer edge of the base plate 80, the elongated piece of material disposed between an outer edge of the slot and an outer edge of the base plate 80 forming a mounting bar 84 which is capable of receiving the hinging legs 76, 78 thereabout to mount the clip 50 in place adjacent to the bar hanger assembly 28. The clip 50 can then function in a manner identical to that described previously relative to the operation of the clip 50 and the bar hanger assembly 30 to latch and unlatch the bar hanger assembly 28. Two of the bar hanger clips 50 are therefore normally employed to latch the respective bar hanger assemblies 28 and 30 in place to the lighting fixture 10 once the elements 32, 34 of each of the assemblies 28, 30 are appropriately extended to fit the dimensions of a particular installation. The clips 50 are normally latched in position after the fixture 10 has been "roughed in", that is, after the bar hanger assemblies 28 and 30 have been fixed in place.

Referring now to FIGS. 3 through 6, a typical bar hanger clip such as the clip 50 is described herein as having certain relative dimensions which allow functioning with bar hanger assemblies of essentially standard dimensions in the art. It is to be understood that the clip 50 can be configured with dimensions other than will be specified hereinafter in order to function with bar hanger assembly structures of given dimensions. A typical width of the clip 50 such as across the flat base portion 52 or the angled distal portion 60 is approximately 0.63 inch, the length of the clip 50 as seen from plan or bottom views being approximately 0.78 inch. The width of the hinging legs 76,78 are each taken to be approximately 0.20 inch with the width of the notch 74, if the clip 50 is so configured, being approximately 0.23 inch. Inner corners of the hinging legs 76, 78 are rounded with a radius of approximately 0.03 inch. The radius of each of the rounded corners 62, 64 is approximately 0.15 inch.

Placement of the flat base portion 52 along the x-axis of a Cartesian coordinate system would result in the angled distal portion 60 of the clip being approximately 30° to the y-axis. The first arcuate section 56 would then have a radius of 0.08 inch with the centerline thereof falling on a line which is 0.10 inch in the direction of the x-coordinate from a line tangent to the curvature of the first arcuate section and parallel to the y-axis. This same tangent line would be approximately 0.04 inch from a line parallel to the y-axis and which intersects the clip 50 at the juncture of the first arcuate section 56 and the planar body portion 54, the planar body portion 54 being angled slightly toward the y-axis from a position to the left of the y-axis.

The plane of the angled distal portion 60 is spaced from a line tangent to the second arcuate section 58 and parallel to said plane at a distance of 0.06 inch, the second arcuate section 58 having a radius of 0.10 inch.

A line perpendicular to the terminal planar body portion 70 and extending to intersect an edge portion of the recurved end portion 72 is spaced a distance of approximately 0.28 inch from a tangent line drawn relative to the third arcuate section 68. The terminal planar body portion 70 extends relative to the plane of the base portion 52 at an angle of approximately 19°. The third arcuate section 68 has a radius of approximately 0.08 inch with the radius of the recurved arcuate end portion 72 being approximately 0.04 inch.

Placement of the center of the circular arc of the first arcuate section 56 at the 0,0 juncture of a Cartesian coordinate system, causes the center of the circular arc of the second arcuate section 58 to be spaced 0.04 inch from the y-axis and 0.34 inch from the x-axis. The center of the third arcuate section 68 would be located 0.08 inch from the x-axis and 0.58 inch from the y-axis.

The distance from the plane of the base portion 52 to the distal end of the angled distal portion 60 would be approximately 0.1 inch with said distal end of the section 66 being approximately 0.19 inch from the y-axis along a normal drawn thereto. The center of the second arcuate section 58 would be approximately 0.37 inch from the normal drawn from the distal end of the portion 60 to the y-axis. The distance of the center of the second arcuate section 58 to a line parallel to the x-axis and extending through the center of the first arcuate section 56 would have a length of approximately 0.34 inch, the distance from the center of the first arcuate section 56 and the lower face of the base portion 52 being approximately 0.10 inch. The distance between a plane parallel to a lower face of the terminal planar body portion 70 and a tangent to the arc of the recurved end portion 72 would be approximately 0.12 inch. All other radii are approximately 0.06 inch unless particularly specified.

Given the relative dimensions specified above, the clip 50 is therefore shaped in order to readily allow mounting of the hinging legs 76, 78 about structural elements which allow pivoting of the clip 50. The relative dimensions further allow engagement respectively of the first arcuate section 56 or the second arcuate section 58 with the aforesaid portions of the bar hanger assemblies 28, 30 to produce the functions described herein.

While particular clip structures have been described herein as being useful according to the invention, it is to be understood that other structural conformations could readily be devised to provide the function provided by the clip 50 which is explicitly described and shown herein. Similarly, other structure herein explicitly described can be configured other than as expressly shown and described herein. Accordingly, it can be readily understood in view of the particular embodiments of the invention which are expressly described hereinabove that the invention can be formed in a wide variety of configurations without departing from the intended scope of the invention, the scope of the invention being defined by the recitations of the appended claims.

What is claimed is:

1. In combination, a lighting fixture having a supporting platform and at least one fixture mounting assembly carried by the fixture, the mounting assembly comprising a bar hanger assembly having a track element and a slide element, at least a portion of the slide element being received within at least a portion of the track element, the track element and the slide element being movable relative to each other, at least one element of the mounting assembly being movable relative to the supporting platform to a position at which the mounting assembly mounts the fixture to structure which supports the fixture and a clip means carried by the fixture for pivotal movement about an axis adjacent to the mounting assembly, the clip means being pivoted between an unlatched position at which the mounting assembly is not engaged by the clip means and at least one latched position at which a portion of the clip means engages a portion of the mounting assembly to maintain at least the portion of the mounting assembly so engaged at a fixed position relative to the fixture, the clip means comprising engaging means formed in said clip means at two spaced locations thereof, a first one of the engaging means latching to the track element when extension of the track element and the slide element to a desired extension disposes the track element in opposing relation to the clip means, a second one of the engaging means latching to the slide element when extension of the track element and the slide element to a desired extension disposes the slide element in opposing relation to the clip means.

2. In the combination of claim 1 wherein the clip means comprise means for mounting the clip means for pivotal movement to a portion of the fixture, the clip means further comprising spaced body portions having an arcuate body portion disposed therebetween, the arcuate body portion latching the mounting assembly in place relative to the fixture on movement of the clip means into engagement with the mounting assembly.

3. In the combination of claim 1 wherein the clip means comprise means for mounting the clip means for pivotal movement to a portion of the fixture, the clip means further comprising first and second arcuate body portions formed in a body of the clip means, the arcuate body portions being spaced apart, the first arcuate body portion engaging the slide element and the second arcuate body portion engaging the track element when extension of the track element and the slide element causes one or the other thereof to be disposed in opposing relation to the clip means.

4. In the combination of claim 3 wherein the clip means further comprises a distal body portion extending from the second arcuate body portion and being engageable to pivot the clip means and to engage the clip means with either the slide element or the track element.

5. In the combination of claim 3 wherein the clip means comprises a body of spring steel formed with planar first and second planar body portions, the first arcuate body portion being disposed between the first and second planar body portions, the planar body portions being disposed at an angle relative to each other, the second arcuate body portion terminating that end of the second planar body portion opposite the first arcuate body portion, the clip means further comprising a proximal planar body portion extending from that end of the first planar body portion opposite the first arcuate body portion, the proximal planar body portion terminating in an arcuate hinging portion, the hinging portion terminating in a recurved end portion, the hinging portion comprising the means for mounting the clip means for pivotal movement.

6. In the combination of claim 5 and wherein the clip means further comprise a distal body portion extending from the second arcuate body portion and being engageable to pivot the clip means and to engage the clip means with either the slide element or the track element.

7. A clip for latching at least one mounting assembly carried by a lighting fixture in a fixed position relative to the lighting fixture on extension to a desired position of at least one element of the mounting assembly relative to the fixture, the clip being carried by the fixture, the clip comprising:

means formed in the clip for engaging at least a portion of the mounting assembly to latch the mounting assembly in a fixed position relative to the fixture; and, means formed in the clip for mounting the clip to the fixture for movement relative thereto between a location at which the clip is disengaged from the mounting assembly to allow positioning of the mounting assembly and between a location at which the clip is engaged with the mounting assembly to latch at least portions of the mounting assembly in a fixed position relative to the fixture.

8. The clip of claim 7 wherein the mounting assembly comprises a bar hanger assembly having a track element and a slide element, at least a portion of the slide element being received within at least a portion of the track element, the track element and the slide element being movable relative to each other, the engaging means being formed in said clip at two spaced locations thereof, a first one of the engaging means latching to the track element when extension of the track element and the slide element to a desired position disposes the track element in opposing relation to the clip, a second one of the engaging means latching to the slide element when extension of the track element and the slide element to a desired position disposes the slide element in opposing relation to the clip.

9. The clip of claim 7 wherein the mounting means comprise means for mounting the clip for pivotal movement to a portion of the fixture.

10. The clip of claim 9 wherein the clip further comprises spaced body portions having an arcuate body portion disposed therebetween, the arcuate body portion latching the mounting assembly in place relative to the fixture on movement of the clip into engagement with the mounting assembly.

11. The clip of claim 8 wherein the mounting means comprise means for mounting the clip means for pivotal movement to a portion of the fixture, the engagement means further comprising first and second arcuate body portions formed in a body of the clip, the arcuate body portions being spaced apart, the first arcuate body portion engaging the slide element and the second arcuate body portion engaging the track element when extension of the track element and the slide element causes one or the other thereof to be disposed in opposing relation to the clip means.

12. The clip of claim 11 wherein the clip means further comprise a distal body portion extending from the second arcuate body portion and being engageable to pivot the clip and to engage the clip with either the slide element or the track element.

13. The clip of claim 8 wherein the clip comprises a body of spring steel formed with planar first and second planar body portions, the first arcuate body portion being disposed between the first and second planar body portions, the planar body portions being disposed at an angle relative to each other, the second arcuate body portion terminating that end of the second planar body portion opposite the first arcuate body portion, the clip further comprising a proximal planar body portion extending from that end of the first planar body portion opposite the first arcuate body portion, the proximal planar body portion terminating in arcuate hinging legs on either lateral side of the proximal planar body portion, the hinging legs each terminating in a recurved end portion, the hinging legs comprising the means for mounting the clip to the fixture for movement relative thereto.

14. The clip of claim 13 wherein the clip further comprises a distal body portion extending from the second arcuate body portion and being engageable to pivot the clip and to engage the clip with either the slide element or the track element.

* * * * *